US010137578B2

(12) United States Patent
Takemura et al.

(10) Patent No.: US 10,137,578 B2
(45) Date of Patent: Nov. 27, 2018

(54) JOINT STRUCTURE, HAND DEVICE, ROBOT ARM AND ROBOT

(71) Applicant: HONDA MOTOR CO., LTD., Tokyo (JP)

(72) Inventors: Yoshinari Takemura, Saitama (JP); Hironori Waita, Saitama (JP); Tetsuya Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/892,497

(22) Filed: Feb. 9, 2018

(65) Prior Publication Data

US 2018/0257244 A1 Sep. 13, 2018

(30) Foreign Application Priority Data

Mar. 9, 2017 (JP) .................. 2017-044950

(51) Int. Cl.
| | |
|---|---|
| *B66C 1/00* | (2006.01) |
| *B25J 19/00* | (2006.01) |
| *B25J 15/02* | (2006.01) |
| *B25J 15/08* | (2006.01) |

(52) U.S. Cl.
CPC .............. *B25J 15/08* (2013.01); *Y10S 901/30* (2013.01)

(58) Field of Classification Search
CPC ............................ B25J 15/08; B25J 15/0206
USPC .......... 294/86.4, 104, 106; 901/1, 15, 31, 38
See application file for complete search history.

(56) References Cited

U.S. PATENT DOCUMENTS

| | | | | |
|---|---|---|---|---|
| 4,921,294 A * | 5/1990 | Klopfenstein | ....... | B65H 29/003 198/803.7 |
| 5,374,093 A * | 12/1994 | Klopfenstein | ....... | B65H 29/003 271/204 |
| 6,010,536 A * | 1/2000 | Veatch | .................... | A61F 2/588 414/6 |
| 6,227,588 B1 * | 5/2001 | Cassoni | .................... | B65H 5/08 198/803.9 |
| 6,616,139 B2 * | 9/2003 | Aesch | ..................... | B65H 5/12 198/470.1 |
| 7,640,855 B2 * | 1/2010 | Hoier | .................. | B41F 27/1231 101/378 |
| 7,950,710 B2 * | 5/2011 | Matsukuma | ............. | B25J 9/104 294/104 |
| 8,831,769 B2 * | 9/2014 | Kim | .................... | G05B 19/4067 219/121.63 |
| 9,987,756 B2 * | 6/2018 | Ishikawa | ............... | B25J 15/0206 |
| 2006/0243498 A1 * | 11/2006 | Takemura | ............ | B25J 17/0283 180/8.1 |

(Continued)

FOREIGN PATENT DOCUMENTS

JP 2015-112651 6/2015

*Primary Examiner* — Paul T Chin
(74) *Attorney, Agent, or Firm* — Rankin, Hill & Clark LLP

(57) ABSTRACT

A second finger 40c of a hand part 40 includes a first link member 40c1 and a second link member 40c2 that are integrally rotatable with respect to a hand base 40a, a spring 40c3, and a second finger side engagement part 40c4. The spring 40c3 biases the second link member 40c2 so that a position of the second link member 40c2 with respect to the first link member 40c1 is maintained. A second finger side engagement part 40c4 is engaged with a hand base side engagement part 40a1 when the second link member 40c2 is moved by a load applied from an object O against a biasing force of the spring 40c3.

6 Claims, 6 Drawing Sheets

(56) References Cited

U.S. PATENT DOCUMENTS

2008/0203955 A1* 8/2008 Gomi ............... B25J 9/1065
                                              318/568.12
2012/0091743 A1* 4/2012 Ohman, III ......... B66C 1/44
                                              294/104

* cited by examiner

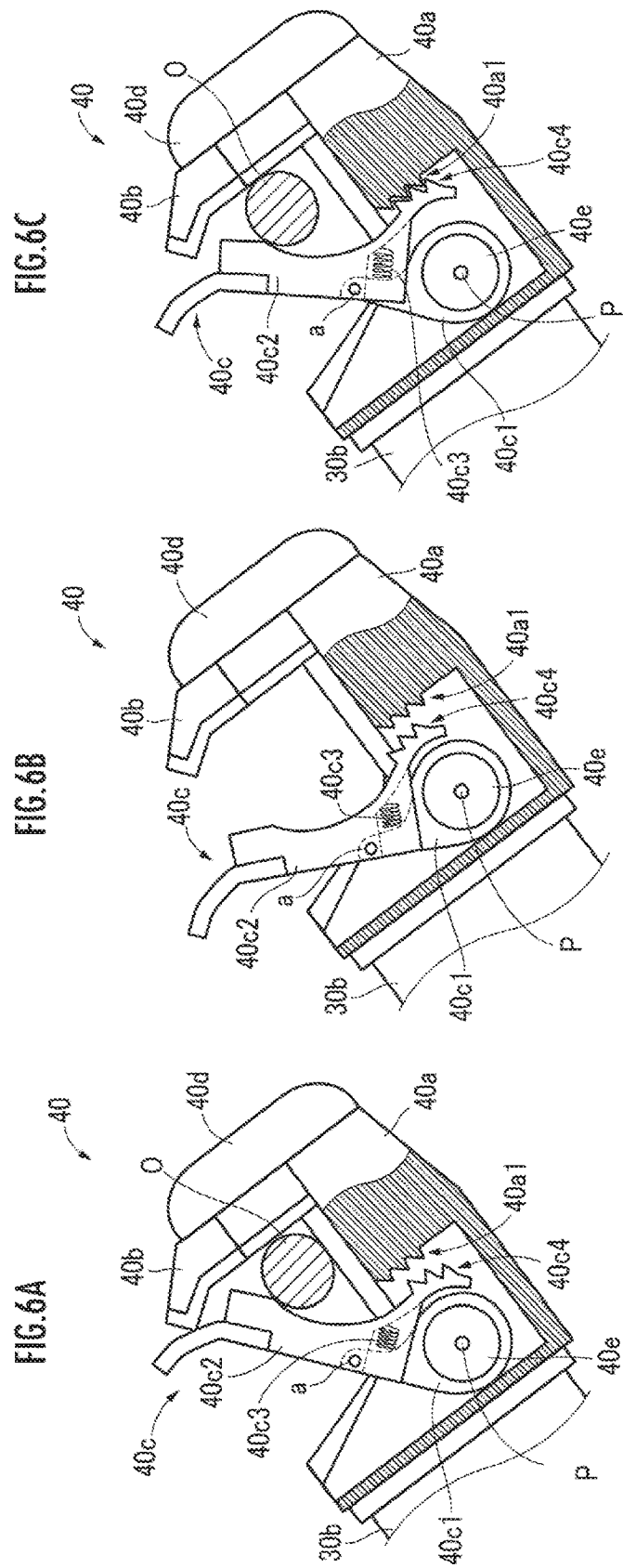

JOINT STRUCTURE, HAND DEVICE, ROBOT ARM AND ROBOT

BACKGROUND OF THE INVENTION

Field of the Invention

The present invention relates to a joint structure, a hand device, a robot arm and a robot that performs an operation of grasping an object or the like using fingers that are relatively movable with respect to a base.

Description of the Related Art

There have been known some hand devices attached to a robot arm that perform an operation of grasping an object or the like using fingers that are rotatably attached to a hand base. A hand device known as such drives the fingers using a drive force of an actuator and a biasing force of an elastic member, and fixes the positions of the fingers by a braking force of a brake mechanism (see Japanese Patent Laid-Open No. 2015-112651).

When a two-legged walking robot goes up stairs while grasping a handrail by a hand device thereof, the robot maintains its posture by operation of the hand device. If a grasping operation of the hand device is released in such a situation (in other words, the operation state of the robot cannot be maintained), the robot cannot maintain its posture, resulting in unintentional movement such as falling, causing breakage in portions other than the hand device.

In the conventional hand device as disclosed in Japanese Patent Laid-Open No. 2015-112651, there is a possibility that the robot cannot maintain its operation state and hence its posture only by a drive force of an actuator and a biasing force of an elastic member, or a braking force of a brake mechanism when the robot falls down (in other words, when a large load exceeding a normal use range is applied to the robot).

The present invention has been made in view of the above problems, and an object of the present invention is to provide a joint structure, a hand device, a robot arm, and a robot that can maintain its operation state even when a large load exceeding a normal use range is applied thereto.

SUMMARY OF THE INVENTION

A joint mechanism of the present invention is a joint structure that comprises: a base; and a link that is movable with respect to the base, and to which a load is applied from an object, the link including: a first link member that is movable with respect to the base; a second link member that is movable with respect to the first link member, and to which a load is applied from the object; an elastic member that is provided between the first link member and the second link member; a drive mechanism that transmits a drive force to the first link member; and an engagement mechanism provided between the base and the second link member, the elastic member biasing the second link member in a direction opposite to a direction in which a load is applied to the second link member from the object so that a position of the second link member with respect to the first link member is maintained at a predetermined position, and the engagement mechanism engaging the base with the second link member to fix the base to the second link member when the load is applied to the second link member from the object so that the position of the second link member with respect to the first link member is moved from the predetermined position against a biasing force of the elastic member.

The "joint structure" used herein comprises a base such as a hand device of a robot arm, and a link including a plurality of link members such as an arm link and a leg link of the two-legged walking robot, for example, at least one of the plurality of link members being movably coupled to the other link member. Note that one of the plurality of link members may be used as the base.

The "drive mechanism" used herein also includes a mechanism for transmitting the drive force to the first link member, and a brake mechanism (a brake mechanism described later, for example) that fixes a position of the first link member with respect to the base.

Thus, in the joint structure of the present invention, the movable link consists of two link members, and the positions of the link members are maintained by the biasing force of the elastic member. The elastic member biases the second link member by its biasing force in a direction opposite to a direction in which a load is applied to the second link member from the object. When the load applied to the second link member does not exceed the biasing force of the elastic member, the positions of the two link members are maintained. When the load exceeds the biasing force, the positions of the two link members are changed.

In the joint structure of the present invention, when the positions of the two link members are moved from predetermined positions against the biasing force of the elastic member (i.e., when the load exceeding the biasing force of the elastic member is applied to the second link member because a weight of the grasped object is changed in a state in which the position of the first link member with respect to the base is fixed by the drive mechanism, and the second link member is strongly pressed against the object through the first link member when the excess drive force is transmitted from the drive force), the engagement mechanism engages the second link member with the base to fix the second link member to the base.

A joint structure of the present invention controls a magnitude of load for actuating the engagement mechanism based on the biasing force of the elastic member, and when the engagement mechanism is actuated, the load transmitted through the second link member is received not by the first link member that is rotatably coupled to the second link member (that is, not by the movable link), but by the base to which the second link member is fixed.

According to the joint structure of the present invention, even when a large load exceeding a normal use range that may exceed the biasing force of the elastic member is applied, the load can be received by the base, thereby capable of maintaining the operation state.

In the joint structure of the present invention, in the joint structure according to claim 1, it is preferable that the drive mechanism is a brake mechanism provided between the base and the first link member, the brake mechanism is configured to restrict a movement of the first link member with respect to the base during operation of the brake mechanism until the load exceeding a load restrictable by the brake mechanism is applied to the first link member, and the elastic member biases the second link member so that the position of the second link member with respect to the first link member is moved, when the load that is smaller than a load restrictable by the brake mechanism and exceeds the normal use range is applied to the second link member.

When a relationship between the load restricted by the brake mechanism and the biasing force of the elastic member is set as described above, the load exceeding the normal use range (e.g., a range of load which is assumed to be applied to the second link member during the normal operation) is applied, and the movement of the second link member with respect to the first link member is started before the load restricted by the brake mechanism is applied to the second link member (i.e., in a stage before slippage occurs in the brake mechanism)

When the load cannot be received by the brake mechanism and the slippage occurs in the brake mechanism, the second link member has already been moved to actuate the engagement mechanism, and therefore the load can be received by the base. As a result, even when the slippage occurs in the brake mechanism, the engagement mechanism is actuated without time-lag, to maintain the operation state.

The hand device of the present invention is a hand device attached to a robot arm, the hand device comprising: a hand base attached to the robot arm; and a movable finger that is rotatable with respect to the hand base; and to which a load is applied from an object, the movable finger including: a first link member that is movable with respect to the hand base; a second link member that is movable with respect to the first link member, and to which a load is applied from the object; an elastic member that is provided between the first link member and the second link member; a drive mechanism that transmits a drive force to the first link member; and an engagement mechanism provided between the hand base and the second link member, the elastic member biasing the second link member in a direction opposite to a direction in Which a load is applied to the second link member from the object so that a position of the second link member with respect to the first link member is maintained at a predetermined position, and the engagement mechanism engaging the hand base with the second link member to fix the hand base to the second link member when the load is applied to the second link member from the object so that the position of the second link member with respect to the first link member is moved from the predetermined position against a biasing force of the elastic member.

Thus, in the hand device of the present invention, the movable finger consists of two link members, and the positions of the link members are maintained by the biasing force of the elastic member. The elastic member biases the second link member by its biasing force in a direction opposite to a direction in which a load is applied to the second link member from the object. When the load applied to the second link member does not exceed the biasing force of the elastic member, the positions of the two link members are maintained. When the load exceeds the biasing force, the positions of the two link members are changed.

In the hand device of the present invention, when the positions of the two link members are moved from predetermined positions against the biasing force of the elastic member (i.e., when the load exceeding the biasing force of the elastic member is applied to the second link member because a weight of the grasped object is changed in a state in which the position of the first link member with respect to the base is fixed by the drive mechanism, and the second link member is strongly pressed against the object through the first link member when the excess drive force is transmitted from the drive force), the engagement mechanism engages the second link member with the hand base to fix the second link member to the hand base.

The hand device of the present invention controls a magnitude of load for actuating the engagement mechanism based on the biasing force of the elastic member, and when the engagement mechanism is actuated, the load transmitted through the second link member is received not by the first link member that is rotatably coupled to the second link member (that is, not by the movable finger), but by the base to which the second link member is fixed.

Thus, according to the hand device of the present invention, even when a large load exceeding a normal use range that may exceed the biasing force of the elastic member is applied, the load can be received by the base, thereby capable of maintaining the operation state.

Preferably, the hand device of the present invention comprises:

a fixed finger that extends from a distal end of the hand base in a direction intersecting a direction from a proximal end to the distal end of the hand base, the movable finger being moved so that the movable finger approaches or separates from the fixed finger.

In a configuration in which the fixed finger extends integrally from the hand base (i.e., the joint mechanism is not provided between the hand base and the finger) in this way, the hand base is firmly connected to the fixed finger. Thus, the fixed finger of the hand device can receive a larger load as compared with the finger provided with the joint mechanism.

The hand device comprises such a fixed finger and a movable finger that moves so as to approach and separate from the fixed finger, thereby capable of grasping the object by the fingers. When a large load exceeding a normal use range is applied in the state of grasping the Object, the load can be received by the fixed finger that can receive a larger load than the conventional one and the movable finger that actuates the engagement mechanism when the excess load as described above is applied.

Even when a large load exceeding a normal use range is applied in the state of grasping the object, the operation state can be sufficiently maintained.

The robot arm of the present invention comprises any one of the above-described hand devices. The robot of the present invention comprises the robot arm described above.

According to the robot arm comprising the above-described hand device and the robot comprising the robot arm, even when a large load exceeding a normal use range is applied, the operation state and the posture can be maintained, thereby capable of preventing breakage from occurring due to falling caused because the robot cannot maintain its posture.

BRIEF DESCRIPTION OF THE DRAWINGS

FIGS. 6A, 6B and 6C are side views each illustrating parts of the hand part and the arm link of the robot of FIG. 1 as a cross section, FIG. 6A illustrates a closed state, FIG. 6B illustrates an opened state, and FIG. 6C illustrates a state in which an excess load is applied from an object in the closed state in a direction to be brought into the opened state; FIG. 7A illustrates a state in which a load equal to or less than a threshold is applied, and FIG. 7B illustrates a state in which a load exceeding the threshold is applied.

DETAILED DESCRIPTION OF THE PREFERRED EMBODIMENTS

Hereinafter, a robot according to an embodiment will be described with reference to the drawings. A robot 1 of the present embodiment is a humanoid robot, and is configured to be able to move by switching between a two-legged walking mode and a four-legged walking mode.

Note that a hand device according to the present invention is applicable not only to the humanoid robot configured as described above, but also to other industrial robots including robots having a form different from that of the robot 1 in the present embodiment if the robots each comprise a robot arm having a hand device.

Figure 1:
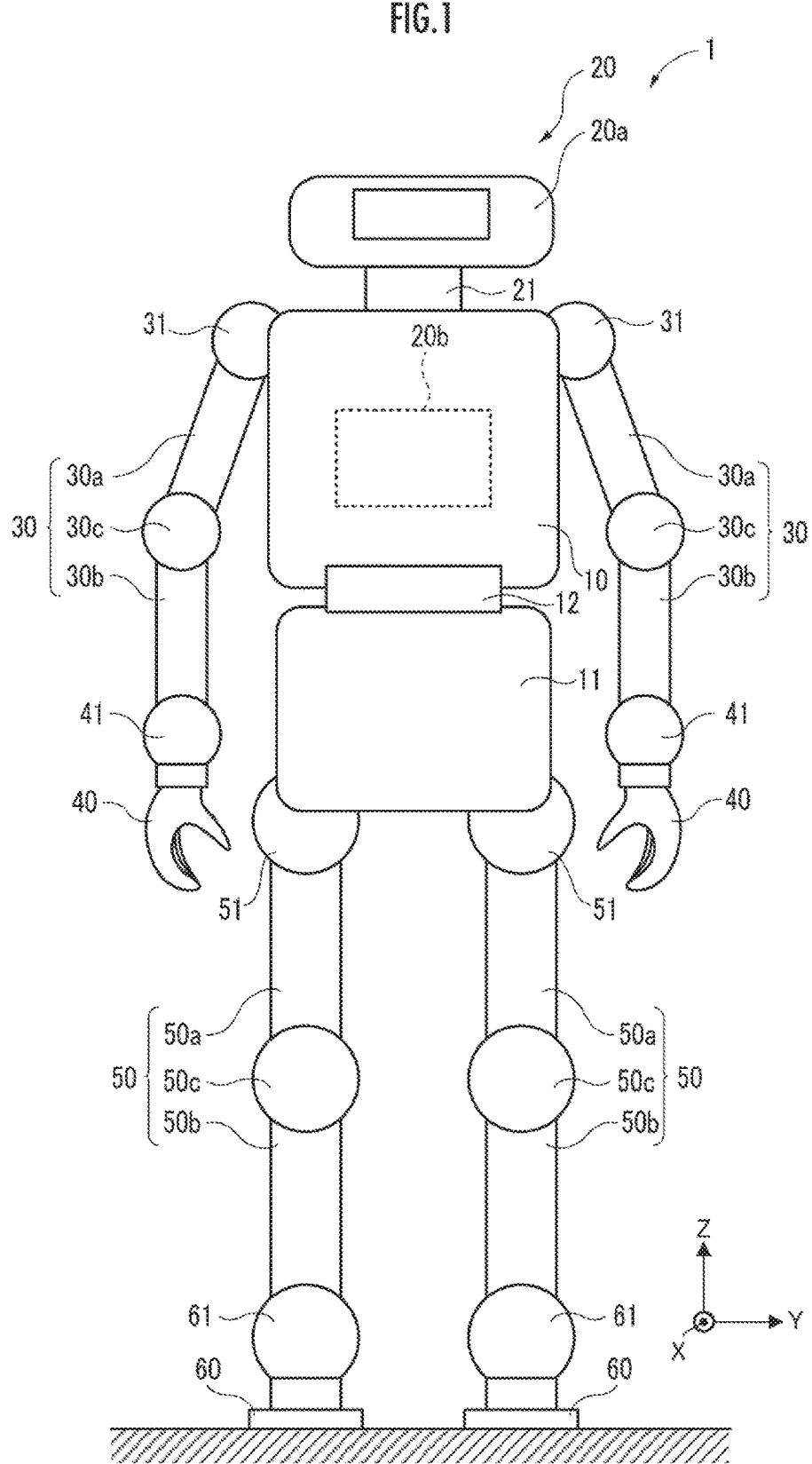
FIG. 1 is a front view schematically illustrating a configuration of a robot according to an embodiment.

First, the configuration of the robot 1 will be described with reference to FIG. 1.

A body of the robot 1 includes an upper base body 10, a lower base body 11 disposed below the upper base body 10, and a waist joint mechanism 12 provided between the upper base body 10 and the lower base body 11. The upper base body 10 and the lower base body 11 are relatively rotatably coupled to each other through the waist joint mechanism 12 corresponding to the waist joint of a human.

A head of the robot 1 is an environment recognition unit 20a of an environment recognition device 20 for recognizing a surrounding environment. A camera for imaging an external environment and a sensor for recognizing a distance to the external environment that are mounted on an environment recognition unit 20a are controlled by a control circuit 20b for an environment recognition unit that is disposed in the upper base body 10. The environment recognition unit 20a is rotatably coupled to the upper base body 10 through a neck joint mechanism 21 corresponding to the neck joint of a human.

Note that since the robot 1 is a humanoid robot, the environment recognition unit 20a corresponding to the head of a human is provided above the upper base body 10. However, the environment recognition unit of the robot of the present invention is not limited to such a configuration, and may be provided at a position other than the position above the upper base body (for example, a front of the upper base body, the lower base body, or the like) according to a use environment of the robot, etc.

Right and left arm bodies of the robot 1 are a pair of arm links 30 (movable links) extending from upper right and left sides of the upper base body 10, respectively. Each arm link 30 is rotatably coupled to the upper base body 10 through a shoulder joint mechanism 31 corresponding to the shoulder joint of a human.

The arm link 30 includes a first arm link part 30a corresponding to the upper arm of a human, a second arm link part 30b corresponding to the forearm of a human, and an elbow joint mechanism 30c corresponding to the elbow joint of a human.

The first arm link part 30a is rotatably coupled to the upper base body 10 through the shoulder joint mechanism 31. The second arm link part 30b is rotatably coupled to the first arm link part 30a through the elbow joint mechanism 30c. A hand part 40 (hand device) corresponding to the hand of a human is coupled to a distal end of the second arm link part 30b.

Note that in the robot 1, the arm link 30 serving as the arm body includes the first arm link part 30a, the second arm link part 30b, and the elbow joint mechanism 30c. However, the arm body of the robot of the present invention is not limited to such a configuration, and may include a single link part, or include three or more link parts, and a plurality of joint parts that couple each link part.

The hand part 40 is one example of an end effector. The hand part 40 is rotatably coupled to the second arm link part 30b of the arm link 30 through a wrist joint mechanism 41 corresponding to the wrist joint of a human. In the robot 1, the hand part 40 and the arm link 30 form a robot arm serving as a manipulator.

Right and left leg bodies of the robot 1 are a pair of right and left leg links 50 (movable links) extending downwardly from a lower portion of a lower base body 11. Each leg link 50 is rotatably coupled to the lower base body 11 through a hip joint mechanism 51 corresponding to the hip joint of a human.

The leg link 50 includes a first leg link part 50a corresponding to the thigh of a human, a second leg link part 50b corresponding to the lower thigh of a human, and a knee joint mechanism 50c corresponding to the knee joint of a human.

The first leg link part 50a is rotatably coupled to the lower base body 11 through the hip joint mechanism 51. The second leg link part 50b is rotatably coupled to the first leg link part 50a through the knee joint mechanism 50c. A foot fiat part 60 corresponding to the foot of a human is coupled to a distal end of the second leg link part 50b.

Note that in the robot 1, the leg link 50 serving as the leg body includes the first leg link part 50a, the second leg link part 50b, and the knee joint mechanism 50c. However, the leg body of the robot of the present invention is not limited to such a configuration, and may include a single link part, or include three or more link parts, and a plurality of joint parts that couple each link part.

The foot flat part 60 is rotatably coupled to the second leg link part 50b of the leg link 50 through an ankle joint mechanism 61 corresponding to the ankle joint of a human.

Next, the degrees of freedom of the joint mechanisms of the robot 1 will be described with respect to FIG. 2.

Note that in the present embodiment, a direction in which each joint mechanism rotates each member will be described based on a posture (hereinafter referred to as a "reference posture") when any of joint mechanisms do not rotate the members coupled thereto, unless otherwise noted. In the case of the robot 1, the reference posture is a state in which the robot 1 stands up straight (a state in which the upper base body 10, the lower base body 11, each arm link 30, and each leg link 50 extend substantially in a vertical direction).

Figure 2:
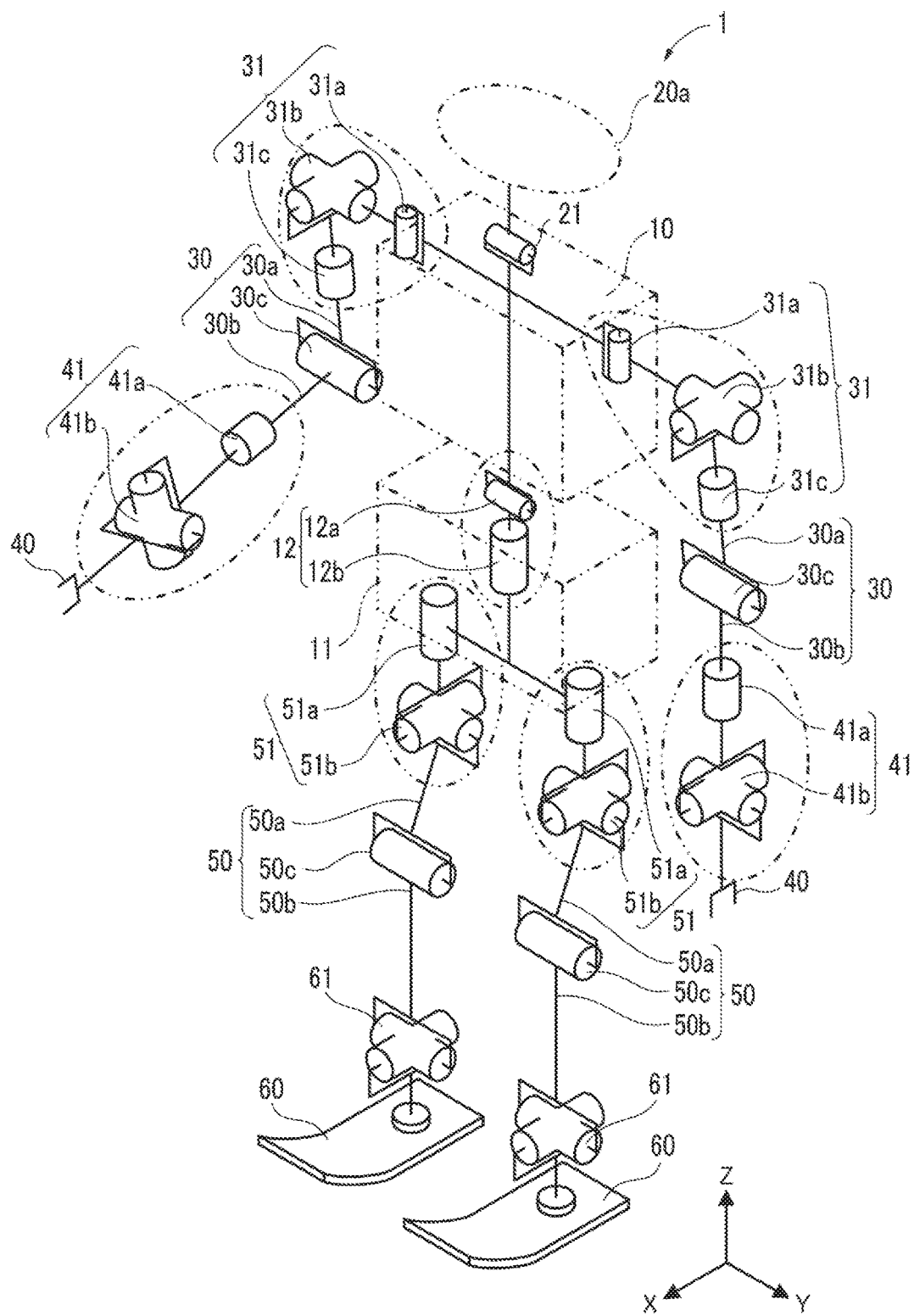
FIG. 2 is a perspective view schematically illustrating joint mechanisms of the robot of FIG. 1.

Moreover, in the present embodiment, a yaw axis, a pitch axis, and a roll axis indicate, as illustrated in FIG. 2, an axis in the vertical direction (a Z-axis), an axis in a right and left direction (a Y-axis), and an axis in a front and rear direction (an X-axis) of the robot 1, respectively, when the robot 1 is in the reference posture. In this case, the yaw axis is a body trunk axis of the upper base body 10 and the lower base body 11.

The waist joint mechanism 12 includes a first waist joint mechanism 12a disposed below the upper base body 10, and a second waist joint mechanism 12b disposed between the first waist joint mechanism 12a and the lower base body 11.

The first waist joint mechanism 12a is coupled such that the upper base body 10 is rotatable around the pitch axis with respect to the lower base body 11 and the second waist joint mechanism 12b. The second waist joint mechanism 12b is coupled such that the upper base body 10 and the first waist joint mechanism 12a are rotatable around the yaw axis with respect to the lower base body 11.

The neck joint mechanism 21 is coupled such that the environment recognition unit 20a is rotatable around the pitch axis with respect to the upper base body 10.

The elbow joint mechanism 30c of the arm link 30 is coupled such that the second arm link part 30b corresponding to the forearm of a human is rotatable around the pitch axis with respect to the first arm link part 30a corresponding to the upper arm of a human.

The shoulder joint mechanism 31 includes a first shoulder joint mechanism 31a disposed so as to be located within a range of widths of the upper base body 10 in the vertical direction and a horizontal direction, a second shoulder joint mechanism 31b disposed on a side of the first shoulder joint mechanism 31a and outside the upper base body 10, and a third shoulder joint mechanism 31c disposed between the second shoulder joint mechanism 31b and the first arm link part 30a of the arm link 30.

The first shoulder joint mechanism 31a is coupled such that the second shoulder joint mechanism 31b is rotatable around the yaw axis with respect to the upper base body 10. The second shoulder joint mechanism 31b is coupled such that the third shoulder joint mechanism 31c is rotatable around the pitch axis and the roll axis with respect to the first shoulder joint mechanism 31a. The third shoulder joint mechanism 31c is coupled such that the arm link 30 is rotatable around the yaw axis with respect to the second shoulder joint mechanism 31b.

The wrist joint mechanism 41 includes a first wrist joint mechanism 41a disposed on a side close to the hand part 40 of the second arm link part 30b of the arm link 30, and a second wrist joint mechanism 41b disposed between the first wrist joint mechanism 41a and the hand part 40.

The first wrist joint mechanism 41a is coupled such that the second wrist joint mechanism 41b is rotatable around the yaw axis with respect to the second arm link part 30b. The second wrist joint mechanism 41b is coupled such that the hand part 40 is rotatable around the roll axis and the pitch axis with respect to the first wrist joint mechanism 41a.

The knee joint mechanism 50c of the leg link 50 is coupled such that the second leg link part 50b corresponding to the lower limb of a human is rotatable around the pitch axis with respect to the first leg link part 50a corresponding to the thigh of a human.

The hip joint mechanism 51 includes a first hip joint mechanism 51a disposed below the lower base body 11, and a second hip joint mechanism 51b disposed on a side close to the leg link 50 of the first hip joint mechanism 51a.

The first hip joint mechanism 51a is coupled such that the second hip joint mechanism 51b is rotatable around the yaw axis with respect to the lower base body 11. The second hip joint mechanism 51b is coupled such that the leg link 50 is rotatable around the pitch axis and the roll axis with respect to the first hip joint mechanism 51a.

The ankle joint mechanism 61 is coupled such that the foot flat part 60 is rotatable around the pitch axis and the roll axis with respect to the second leg link part 50b.

Note that configurations of the waist joint mechanism, the neck joint mechanism, the shoulder joint mechanism, the elbow joint mechanism, the knee joint mechanism, the hip joint mechanism and the ankle joint mechanism in the robot of the present invention are not limited to the above-described configurations, and may be appropriately changed according to applications of the robot, arrangement spaces of joints in the robot, or the like. For example, any of joint mechanisms may be omitted, or a joint mechanism other than the above-described joint mechanisms may be added.

Next, two walking modes of the robot 1 will be described with reference to FIGS. 3 and 4. Note that in FIG. 3, the arm link 30 is not illustrated for the sake of easy understanding.

Note that in the present embodiment, "landing" of the hand parts 40 or the foot flat parts 60 means that the hand parts 40 or the foot flat parts 60 come into contact with external environment such that the hand part 40 or the foot flat parts 60 receive a contact reactive force against a force acting on the robot 1.

Figure 3:
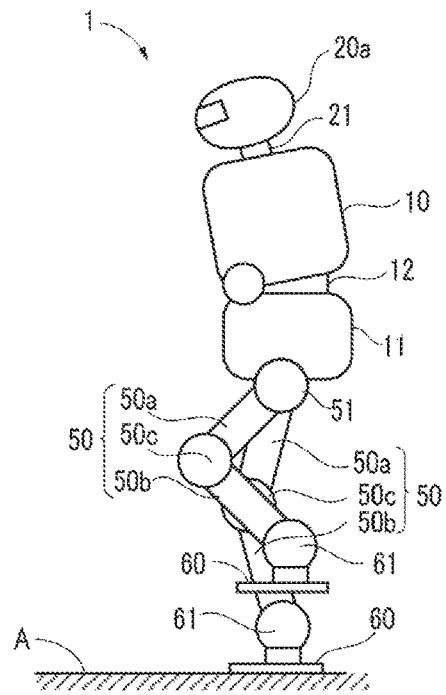
FIG. 3 is a side view illustrating a state in which the robot of FIG. 1 moves in a two-legged walking mode.

As illustrated in FIG. 3, in the two-legged walking mode, the following operation is repeated: while the foot flat part 60 at a distal end of one of the pair of leg links 50 is landed on a ground A (a state in which the one of the leg links 50 is used as a support leg), the foot flat part 60 at the distal end of the other leg link 50 moves in the air, and is landed (the other leg link 50 operates as an idling leg). In this case, the leg links 50 alternately operates as the idling leg. Moreover, the not-illustrated arm links 30 are in a non-landed state.

Figure 4:
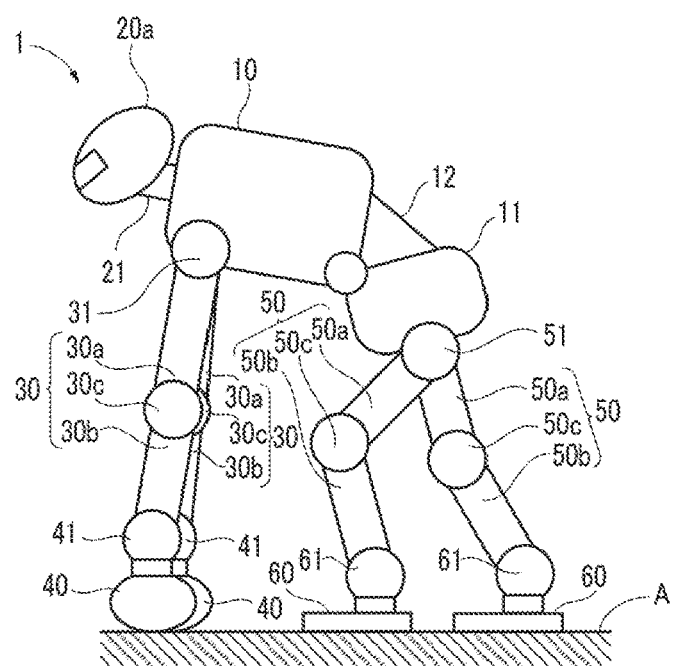
FIG. 4 is a side view illustrating a state in which the robot of FIG. 1 moves in a four-legged walking mode.

As illustrated in FIG. 4, in the four-legged walking mode, the following operation is repeated: While two or three of the hand parts 40 at the distal ends of the arm links 30 and the foot flat parts 60 at the distal ends of the leg links 50 are landed on the ground A (a state in which the two or three of the arm links 30 and the leg links 50 are used as the support legs), the remaining two or one hand part(s) 40 or foot flat part(s) 60 move(s) in the air, and then are (is) landed (the remaining two or one hand part(s) 30 or leg link(s) 50 operate(s) as idling leg(s)). In this case, the arm link 30 or the leg link 50 operating as the idling leg is periodically switched by a predetermined rule.

Note that the operation in the four-legged walking mode is not limited to the above-described operation. For example, the following operation may be repeated: while one of the hand parts 40 at the distal ends of the arm links 30 and the foot flat parts 60 at the distal ends of the leg links 50 is landed on the ground A (a state in which the one of the hand parts 40 or the foot flat parts 60 is used as a support leg), the remaining three of the hand parts 40 and the foot flat parts 60 move in the air, and then are landed (the remaining three of the hand parts 40 or the foot flat parts 60 operate as idling legs).

In addition, the following operation can be repeated: the hand parts 40 at the distal ends of the arm links 30 and the foot flat parts 60 at the distal ends of the leg links 50 move all together in the air (i.e., the robot 1 jumps), and then are landed.

Hereinafter, the hand part 40 will be described with reference to FIGS. 5, 6A, 6B, and 6C. Note that the hand part 40 in FIGS. 5, 6A, 6B, and 6C is located on a right side of the robot 1 at the time of the reference posture, and forms a right hand.

Figure 5:
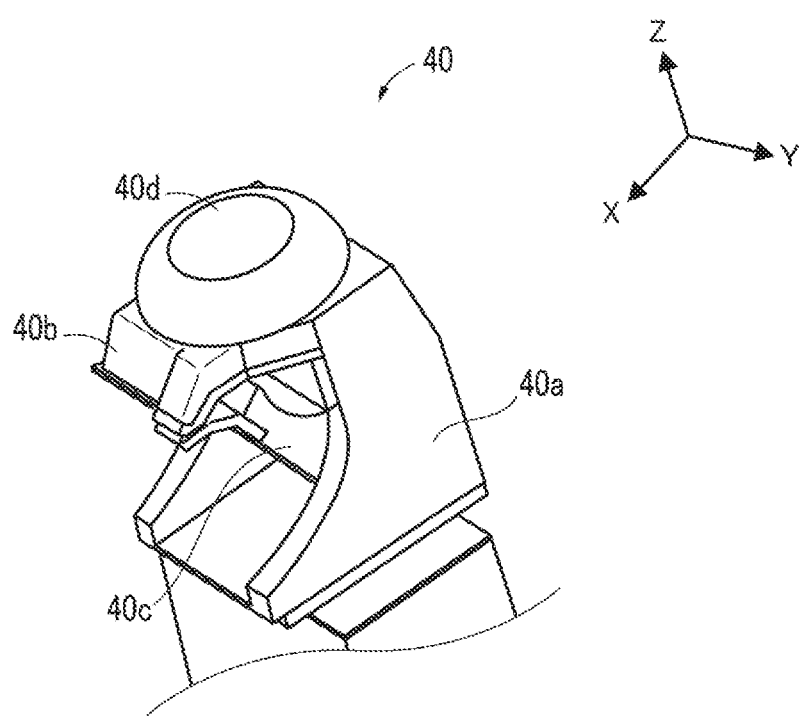
FIG. 5 is a perspective view illustrating parts of a hand part and an arm link of the robot of FIG. 1.

First, a configuration of the hand part 40 will be described in detail with reference to FIG. 5.

The hand part 40 includes a hand base 40a corresponding to the palm and the back of a human hand, a first finger 40b (fixed finger) that is a single member corresponding to the index finger, the middle finger, the third finger, and the little finger of a human, and a second finger 40c (movable finger, link part) corresponding to the thumb of a human.

The first finger 40b extends from the distal end of the hand base 40a in a direction (a left side in a direction X in FIG.

5A) intersecting a direction from a proximal end to the distal end of the hand base 40a (a direction Z in FIG. 5A (longitudinal direction of the hand base 40a)). The first finger 40b is configured integrally with the hand base 40a, and is fixed to the hand base 40a. A buffer member 40d is attached to a surface on an opposite side of the hand base 40a of the first finger 40b.

In the hand part 40 comprising the first finger 40b configured as described above, the first finger 40b applies a load to an object through a surface located on the opposite side of the hand base 40a (i.e., the buffer member 40d) in a case of a pushing operation. Meanwhile, the first finger 40b applies a load to the object through a surface of the hand base 40a side of the first finger 40b in a case of a pulling operation.

Since in a hand device of the conventional robot, a hand base and a first finger are coupled to each other through the joint mechanism, the strength of the joint part is not so high. Therefore, when a large load is applied to the object in the case of the pushing operation or the pulling operation(i.e., when the large load is applied to the first finger), breakage may be thereby caused in the joint mechanism.

However, since in the robot 1 of the present embodiment, the first finger 40b of the hand part 40 is fixed to the hand base 40a (i.e., the first finger 40b is not coupled to the hand base 40a through the joint mechanism as in the hand device of the conventional robot), the strength of the entire hand device is higher than that of the conventional hand device.

Therefore, in the hand part 40, even if a large load is applied to the object in the case of the pushing operation or the pulling operation (i.e., even if a large load is applied to the first finger 40b), breakage does not easily occur between the hand base 40a and the first finger 40b. Moreover, since the buffer member 40d protects the first finger 40b in the case of the pushing operation, breakage does not easily occur in the first finger 40b itself either.

Since the hand part 40 has a sufficiently high strength, breakage does not occur in the hand part 40 even when the object is held so that a self-weight of the robot 1 is supported by the hand part 40. As a result, the robot 1 can perform movement such as going up a ladder by operation of the hand part 40 and rotation of the arm link 30. Moreover, the robot 1 can move while landing the first finger 40b of the hand part 40 (the buffer member 40d attached to the first finger 40b in the present embodiment).

As illustrated in FIGS. 6A, 6B, and 6C, the second finger 40c is attached to the hand base 40a so as to face a surface of the hand base 40a side of the distal end of the first finger 40b. The second finger 40c is rotated around a fulcrum P located inside the hand base 40a by a drive mechanism 40e provided inside the hand base 40a so that the distal end of the second finger 40c approaches or separates from the first finger 40b.

Since the second finger 40c is configured as described above, the hand part 40 can easily perform an operation of grasping the object by the hand base 40a, the first finger 40b, and the second finger 40c even when the first finger 40b is fixed.

More specifically, as illustrated in FIG. 6A, the hand part 40 can grip an object O by three-point contact using a surface of the hand base 40a side of the first finger 40b, a surface of the hand base 40a side of the second finger 40c, and a surface on a side where the first finger 40b extends, of the hand base 40a in a state in which the distal end of the second finger 40c approaches the first finger 40b (hereinafter referred to as a "closed state").

The distal end of the second finger 40c is located at a position closer to the hand base 40a than the distal end of the first finger 40b in the closed state. Therefore, the entire hand part 40 is more reduced in size in the closed state as compared with a state in which the distal end of the second finger 40c is separated from the distal end of the first finger 40b (hereinafter referred to as an "opened state", see FIG. 6B).

Therefore, when the robot 1 performs work in a narrow place, the hand part 40 serving as an end effector can be easily moved to a working area by setting the robot 1 to be the closed state. As a result, contact of the hand part 40 with the external environment can be prevented, and breakage of the hand part 40 can be prevented.

Meanwhile, as illustrated in FIG. 6B, the distal end of the second finger 40c is located at a position more separated from the hand base 40a than the distal end of the first finger 40b in the opened state. Therefore, the hand part 40 can perform an operation of pushing a button or the like by the distal end of the second finger 40c (specifically, a nail provided at the distal end of the second finger 40c).

The drive mechanism 40e for rotating, the second finger 40c includes a drive source that generates a drive force, a reducer that decelerates the drive force and transmits the drive force to the second finger 40c, and an electromagnetic brake that holds a position of the second finger 40c with respect to the hand base 40a. In other words, the drive mechanism 40e is used as a brake mechanism to hold the position of the second finger 40c with respect to the hand base 40a.

The electromagnetic brake of the drive mechanism 40e is actuated at the time of non-drive of the drive source (i.e., when the drive force is not transmitted to the second finger 40c) to fix the second finger 40c. Meanwhile, the electromagnetic brake is not actuated at the time of drive (when the drive force is transmitted to the second finger 40c) so that the second finger 40c is rotatable. Therefore, if supply of the drive force stops during the operation, the position of the second finger 40c with respect to the hand base 40a is held by the electromagnetic brake.

Next, a joint structure including the hand base 40a of the hand part 40 and the second finger 40c serving as a movable finger will be described with reference to FIGS. 6A, 6B, 6C, 7A, and 7B As illustrated in FIGS. 6A, 6B, and 6C, the second finger 40c includes a first link member 40c1 that is rotatable with respect to the hand base 40a, and a second link member 40c2 that is rotatable together with the first link member 40c1 and to which a load is applied from the object O.

The first link member 40c1 and the second link member 40c2 are mutually rotatably fixed to be relatively rotatable around a shaft a. A spring 40c3 (elastic member) that rotates integrally with the first link member 40c1 and the second link member 40c2 is disposed between the first link member 40c1 and the second link 40c2.

The spring 40c3 biases the second link member 40c2 in a direction opposite to a direction in Which a load is applied to the second link member 40c2 from the object O so that a position of the second link member 40c2 with respect to the first link member 40c1 is maintained at a predetermined position (a position illustrated in FIGS. 6A, 6B). Note that a rubber or the like may be used instead of the spring 40c3 if it can bias the second link member 40c2.

A second finger side engagement part 40c4 extends from the second link member 40c2 so as to rotate integrally with the second link member 40c2. The second finger side engagement part 40c4 is engageable with a hand base side engagement part 40a1 provided in the hand base 40a. In other words, an engagement mechanism of the joint structure is configured by the hand base side engagement part 40a1 and the second finger side engagement part 40c4.

Here, engagement timing of the engagement mechanism will be described with reference to FIGS. 7A and 7B.

Figure 7A:
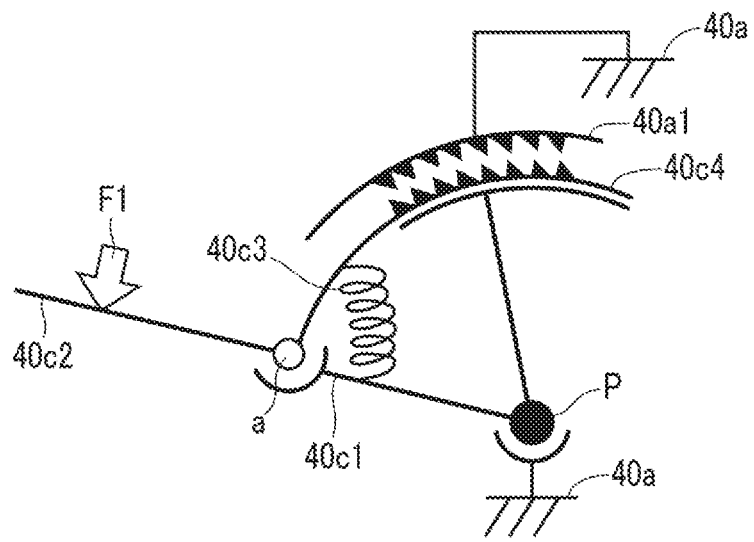
FIGS. 7A and 7B are schematic views illustrating a state in which a load is applied to a second finger of the hand part of the robot of FIG. 1.

As illustrated in FIG. 7A, when only a load F1 not exceeding a biasing force of the spring 40c3 is applied to the second link member 40c2, the position of the second link member 40c2 with respect to the first link member 40c1 is maintained by the biasing force of the spring 40c3 (the states illustrated in FIGS. 6A and 6B are maintained), and the hand base side engagement part 40a1 is not engaged with the second finger side engagement part 40c4.

Figure 7B:
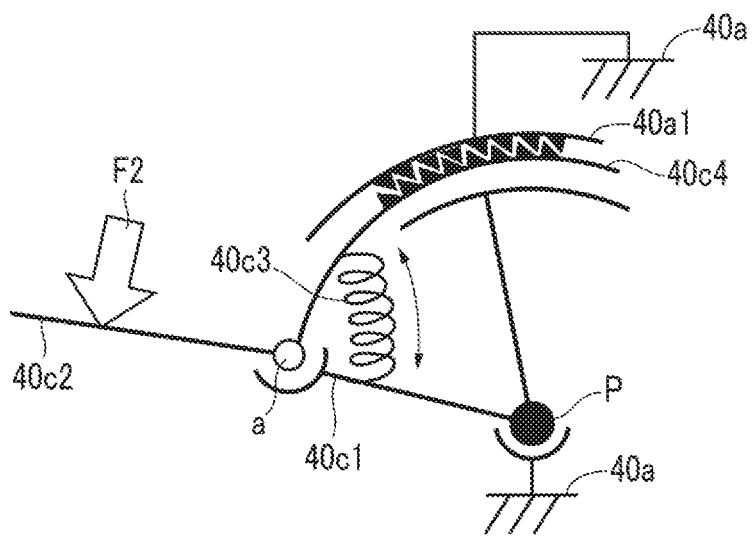

Meanwhile, as illustrated in FIG. 7B, when a large load 12 exceeding the biasing force of the spring 40c3 is applied to the second link member 40c2, the position of the second link member 40c2 with respect to the first link member 40c1 is changed against the biasing force of the spring 40c3 (the spring 40c3 extends) (the state illustrated in FIG. 6A is changed to the state illustrated in FIG. 6C), and the hand base side engagement part 40a1 is engaged with the second finger side engagement part 40c4 so that the second link member 40c2 is fixed to the hand base 40a.

In other words, the hand part 40 controls the magnitude of load for engaging the hand base side engagement part 40a1 and the second finger side engagement part 40c4 based on the biasing force of the spring 40c3. When the hand base side engagement part 40a1 is engaged with the second finger side engagement part 40c4, the load transmitted through the second link member 40c2 is received not by the first link member 40c1 (i.e., not by the second finger 40c) that is rotatably coupled to the second link member 40c2, but by the hand base 40a to which the second link member 40c2 is fixed.

Then, even when a large load exceeding a normal use range is applied to the second finger 40c from the object O in the state illustrated in FIG. 6A, for example, the rotation of the second finger 40c is restricted to the state illustrated in FIG. 6C by the biasing force of the spring 40c3 and the engagement between the hand base side engagement part 40a1 and the second finger side engagement part 40c4.

Specifically, for example, even when the robot 1 loses its balance when the robot 1 stands while gripping the ladder (the object O), to thereby be in a state of hanging from the ladder, and it becomes necessary to support the Whole weight of the robot 1 only by a grasping operation of the hand part 40, the state of grasping the ladder is maintained by the biasing force of the spring 40c3 and the engagement between the hand base side engagement part 40a1 and the second finger side engagement part 40c4.

Accordingly, when the posture of the robot 1 is maintained by the hand part 40, the operation state of the hand part 40 is maintained even when the robot 1 loses its balance, and the robot 1 does not fall down completely, thereby capable of preventing breakage from occurring in portions (e.g., the upper base body 10 of the robot 1) other than the hand part 40.

The drive mechanism 40e of the hand part 40 has the electromagnetic brake. In other words, the drive mechanism 40e is configured to restrict the movement of the first link member 40c1 with respect to the hand base 40a during operation until the load exceeding the predetermined value (i.e., a load exceeding a guarantee value) is applied to the first link member 40c1.

The "guarantee value" of the electromagnetic brake used herein indicates a value of torque at which the position of the first link member 40c1 with respect to the hand base 40a can be surely maintained by the electromagnetic brake.

When the load that is smaller than a load restricted (restrictable) by the drive mechanism 40e (i.e., the guarantee value), and exceeds the normal use range (e.g., a range of load which is assumed to be applied to the hand part 40 dating the normal operation) is applied to the second link member 40c2, the biasing force of the spring 40c3 is set so that the position of the second link member 40c2 with respect to the first link member 40c1 is moved.

In other words, the biasing force of the spring 40c3 is set so that the hand base side engagement part 40a1 is engaged with the second finger side engagement part 40c4 before the load exceeding the guarantee value is applied to the second link member 40c2 to thereby cause the slippage in the drive mechanism 40e When the relationship between the guarantee value of the electromagnetic brake and the biasing force of the spring 40c3 is set as described above, slippage occurs in the drive mechanism 40e, so that the movement of the second link member 40c2 with respect to the first link member 40c1 is started before the movement of the first link member 40c1 with respect to the hand base 40a is started.

When the load exceeding the guarantee value is applied to the second link member 40c2 and the slippage occurs in the drive mechanism 40e, the second link member 40c2 has already been moved to actuate the engagement mechanism, and therefore the load can be received by the hand base 40a. As a result, even when the slippage occurs in the drive mechanism 40e, the engagement mechanism is actuated without time-lag, to maintain the operation state of the hand part 40.

The embodiment illustrated in the figures has been described above, but is not limited thereto.

In the above-described embodiment, the joint structure is applied to the hand device, for example. The "joint structure" used herein comprises a base such as a hand device of a robot arm, and a link including a plurality of link members such as an arm link and a leg link of the two-legged walking robot, for example, at least one of the plurality of link members being movably coupled to the other link member. Note that one of the plurality of link members may be used as the base.

Then, the joint structure of the present invention may be applied to parts other than the hand device of the robot. For example, the joint structure of the present invention may be applied to the upper base body 10, the shoulder joint mechanism 31, and the first arm link part 30a of the robot 1 in the above-described embodiment. Moreover, the joint structure of the present invention may be applied to a robot arm of a working robot other than a humanoid robot.

In the above-described embodiment, the link of the joint structure is the second finger 40c that is rotatable with respect to the hand base 40a.

However, the link of the present invention may be a link that is movable with respective to the base. For example, the link may straightly approach or separate from the base.

In the above-described embodiment, the first finger 40b serves as a fixed finger, and the second finger 40c serves as a movable finger. In other words, the fixed finger can receive a larger load than the finger connected the base through the joint, the movable finger is configured to actuate the engagement mechanism when the excess load is applied as described above, and the fixed finger and the movable finger configured as described above forming the hand device are adopted so that the operation state can be sufficiently maintained even when a large load exceeding a normal use range is applied in a state of gasping, an object.

However, the hand device of the present invention is not limited to a hand device formed by combining the fixed finger and the movable finger. For example, all fingers may be movable fingers.

In the above-described embodiment, in the hand part 40, the hand base side engagement part 40a1 and the second finger side engagement part 40c4 (i.e., an engagement mechanism) are provided on the first finger 40b side of the fulcrum P.

However, a position of the engagement mechanism of the present invention is not limited to such a position, and the engagement mechanism may be provided between base and the second link member (i.e., at a position at which the second link member can be fixed to the base in engagement).

In the above-described embodiment, the drive mechanism 40e serves as a brake mechanism having the electromagnetic brake, and when the load that is smaller than a load restricted by the drive mechanism 40e, and exceeds the normal use range is applied to the second link member 40c2, the biasing force of the spring 40c3 is set so that the movement of the position of the second link member 40c2 is started. Even when the slippage occurs in the drive mechanism 40e serving as the brake mechanism, the engagement mechanism is actuated without time-lag, to maintain the operation state of the hand part 40.

However, the elastic member of the hand device of the present invention is not limited to an elastic member having a biasing force of such a magnitude, and may be any elastic members as long as the second link member can be biased to maintain the position of the second link member with respect to the first link member at a predetermined position.

The drive mechanism is not limited to the brake mechanism having the electromagnetic brake, and may be any drive mechanisms as long as the drive force can be transmitted to the first link member to fix the position of the first link member with respect to the base. For example, the drive mechanism may be an engagement mechanism of manually locking after the hand device is in the state of grasping an object.

REFERENCE SIGNS LIST

1 robot
10 upper base body
11 lower base body
12 waist joint mechanism
12a first waist joint mechanism
12b second waist joint mechanism
20 environment recognition device
20a environment recognition unit (base body side recognition device)
20b control circuit for an environment recognition unit
21 neck joint mechanism
30 arm link
30a first arm link part
30b second arm link part
30c elbow joint mechanism
31 shoulder joint mechanism
31a first shoulder joint mechanism
31b second shoulder joint mechanism
31c third shoulder joint mechanism
40 hand part (hand device)
40a hand base
40a1 hand base side engagement part
40b first finger (fixed finger)
40c second finger (movable finger, link)
40c1 first link member
40c2 second link member
40c3 spring (elastic member)
40c4 second finger side engagement part
40d buffer member
40e drive mechanism (brake mechanism)
41 wrist joint mechanism
41a first wrist joint mechanism
41b second wrist joint mechanism
41c drive part
50 leg link
50a first leg link part
50b second leg link part
50c knee joint mechanism
51 hip joint mechanism
51a first hip joint mechanism
51b second hip joint mechanism
60 foot flat part
61 ankle joint mechanism
a fulcrum of rotation of second link member 40c2
A ground
F1, F2 load
O object
P fulcrum of rotation of second finger 40c

What is claimed is:

1. A joint structure comprising:
   a base; and
   a link that is movable with respect to the base, and to which a load is applied from an object,
   wherein the link includes: a first link member that is movable with respect to the base; a second link member that is movable with respect to the first link member, and to which a load is applied from the object; an elastic member that is provided between the first link member and the second link member; a drive mechanism that transmits a drive force to the first link member; and an engagement mechanism provided between the base and the second link member,
   the elastic member biases the second link member in a direction opposite to a direction in Which a load is applied to the second link member from the object so that a position of the second link member with respect to the first link member is maintained at a predetermined position, and
   the engagement mechanism engages the base with the second link member to fix the base to the second link member when the load is applied to the second link member from the object so that the position of the second link member with respect to the first link member is moved from the predetermined position against a biasing force of the elastic member.

2. The joint structure according to claim 1, wherein
   the drive mechanism is a brake mechanism provided between the base and the first link member,
   the brake mechanism is configured to restrict a movement of the first link member with respect to the base during operation of the brake mechanism until a load exceeding a load restrictable by the brake mechanism is applied to the first link member, and
   the elastic member biases the second link member so that the position of the second link member with respect to the first link member is moved, when the load that is smaller than the load restrictable by the brake mechanism and exceeds a normal use range is applied to the second link member.

3. A hand device attached to a robot arm, comprising:
a hand base attached to the robot arm; and
a movable finger that is rotatable with respect to the hand base; and to which a load is applied from an object,
wherein the movable finger includes: a first link member that is movable with respect to the hand base; a second link member that is movable with respect to the first link member, and to which a load is applied from the object; an elastic member that is provided between the first link member and the second link member; a drive mechanism that transmits a drive force to the first link member; and an engagement mechanism provided between the hand base and the second link member,
wherein the elastic member biases the second link member in a direction opposite to a direction in which a load is applied to the second link member from the object so that a position of the second link member with respect to the first link member is maintained at a predetermined position, and
the engagement mechanism engages the hand base with the second link member to fix the hand base to the second link member when the load is applied to the second link member from the object so that the position of the second link member with respect to the first link member is moved from the predetermined position against a biasing force of the elastic member.

4. The hand device according to claim 3, further comprising:
a fixed finger that extends from a distal end of the hand base in a direction intersecting a direction from a proximal end to the distal end of the hand base,
wherein the movable finger is moved so that the movable finger approaches or separates from the fixed finger.

5. A robot arm comprising the hand device according to claim 3.

6. A robot comprising the robot arm according to claim 5.

* * * * *